Jan. 4, 1966     F. P. DUNIGAN ETAL     3,227,886
PHOTOELECTRIC ARTICLE CODING AND CLASSIFYING DEVICE
Filed May 21, 1962
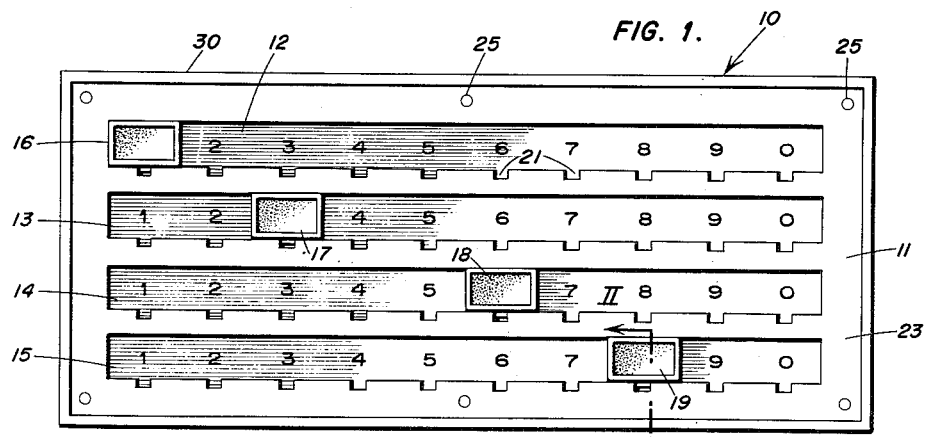
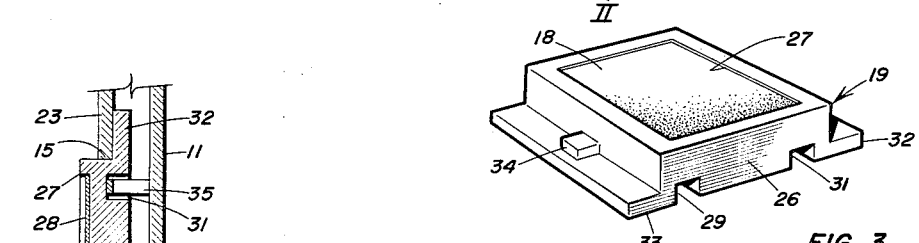
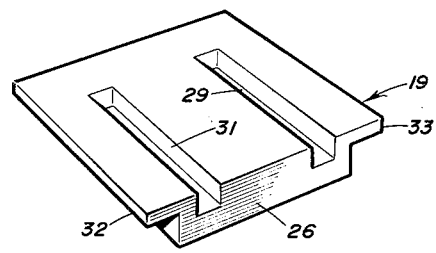
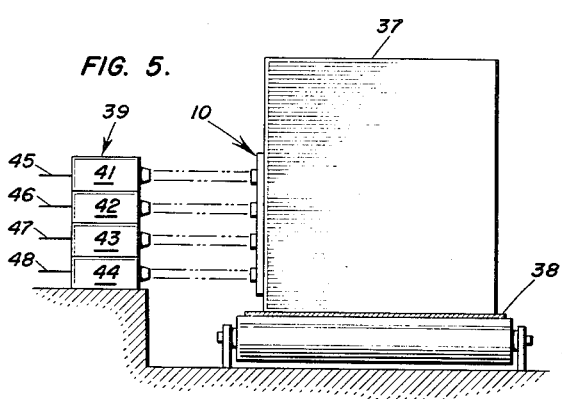
FRANCIS P. DUNIGAN
RUDOLPH F. SCHWERDT, JR.
INVENTORS
BY *Norman S. Blodgett*
ATTORNEY 3,227,886
PHOTOELECTRIC ARTICLE CODING AND
CLASSIFYING DEVICE
Francis P. Dunigan, Holden, Mass., and Rudolph F.
Schwerdt, Jr., Long Branch, N.J., assignors to Machinery Electrification, Inc., Northboro, Mass., a corporation of Massachusetts
Filed May 21, 1962, Ser. No. 196,401
2 Claims. (Cl. 250—223)

This invention relates to an article classifying device and more particularly to apparatus arranged to indicate the nature of goods in an automatic warehousing system or the like.

In an automatic warehousing system it is common practice, in order to accomplish automatic storage and retrieval, to indicate the nature of contents of a package by use of a code on the side of the package. This code may be picked up by a sensing apparatus as it goes by a sensing station. The sensing device, by interpreting the code, operates the elements of the conveyor system in a manner which will cause the container to go to a particular destination. One of the methods used for coding packages is by the use of retro-reflective tape placed on the package in a certain geometric relationship. This code is read by an optical system by which light is projected toward the package but is not returned unless the retro-reflective material is in line with the optical system. When the light is returned to the sensing device, this fact is indicated to a photo-cell in the optical system resulting in an electrical pulse. The pulses emanating from the scanning station are interpreted by a computer and the computer, in turn, gives instructions to the machinery in the conveying system. Setting up the coding elements on the package is, however, a time-consuming hand operation and very often results in inaccurate placing of the elements, so that the pulses which are transmitted to the conveyor control apparatus sometimes gives a false reading and the package is directed to the wrong destination. Furthermore, when the package is of a permanent nature, as a metal container, and must be used over and over again for different goods, the changing of the code is difficult, since it necessitates removal of the retro-reflective material by scraping or some similar hand operation. These and other difficulties experienced with the prior art devices have been obviated in a novel manner by the present invention.

It is, therefore, an outstanding object of the invention to provide a coding device of a permanent nature the arrangement of which may be changed readily and accurately.

Another object of this invention is the provision of a coding device for attachment to a surface of a container in which the indicating members are very accurately located relative to one another.

A further object of the present invention is the provision of a coding device of a very rugged nature which is not rendered inoperative by use in a conveyor system.

It is another object of the instant invention to provide a coding device making use of the retro-reflective principle in which the retro-reflective material is not rendered inoperative in normal usage in an automatic warehousing system.

It is a still further object of the invention to provide a control system for identifying objects by use of a plural digit code.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings, in which:

FIG. 1 is an elevational view of a coding device embodying the principles of the present invention;

FIG. 2 is a sectional view of a portion of the invention taken on the line II—II of FIG. 1;

FIG. 3 is a perspective view of an indicating member used in connection with the invention;

FIG. 4 is a reverse perspective view of the indicating member shown in FIG. 3, and FIG. 5 is a schematic view of conveyor apparatus in an automatic warehouse making use of the invention.

Referring first to FIG. 1, wherein are best shown the general features of the invention, the article classifying or coding device, indicated generally by the reference numeral 10, is shown as consisting of a support member 11 provided with a series of spaced parallel grooves 12, 13, 14, and 15. The grooves 12, 13, 14, and 15 carry indicating members 16, 17, 18, and 19, respectively. The bottom edge of each groove is provided with a series of rectilinear notches 21. The preferred embodiment has ten of these notches evenly spaced across the length of the groove, thus permitting coding according to the numbers 1 through 10, although, of course, it will be understood that any system of coding may be used. As evident in the drawings, a position number is printed on the bottom surface of each groove adjacent each notch.

The details of construction of the device are shown in FIG. 2. The support member 11 is formed with a back plate 22 and a front plate 23 which are maintained in spaced parallel relation by a spacer plate 24 which extends around the margin and is held in place by fasteners 25 (see FIG. 1). A binding strip 30 extends around the margin of the support member and acts as a protecting member for the edge of the support member as well as preventing sharp edges of the plates from cutting elements of the conveyor system, or doing injury to persons handling a container to which the coding device is attached.

Referring next to FIG. 3, it can be seen that the indicating member 19 consists of a rectangular main body 26 having on its outwardly-directed face a rectangular recess 27 in which is mounted an insert 28 formed of retro-reflective material. The insert 28 consists of a sheet having pressure-sensitive adhesive on the back surface. On the front surface is mounted a coating of transparent glass bead microspheres which serve as minute spherelenses and have a refractive index ($N_D$) of approximately 1.9. Each sphere is capped on its back extremity (away from the viewer) with a specularly-reflecting hemispherical film or layer. The diameters of the glass bead microspheres used in the material are in the range from 25 to 75 microns. On the rearwardly-directed surface of its main body, each indicating member is provided with two grooves 29 and 31. Extending upwardly from the upper edge of the main body at the rear thereof is a flange 32; from the lower edge extends a flange 33. Lying in the recess formed by the lower edge of the main body 26 and the outwardly-directed face of the flange 33 is a rectangular detent finger 34. The finger 34 is only slightly smaller than the notches 21 and is adapted to fit snugly into such a notch. As is evident in FIG. 2, however, the finger 34 has a thickness somewhat less than the thickness of the front plate 23 so that the finger does not protrude forwardly of the plate 21 when the flanges 33 and 32 are pressed snugly against the rear surface of the front plate 23 adjacent the edges of the particular groove in which it is located. A leaf spring 35 is mounted in the groove 31 and presses against the forwardly-directed face of the back plate 22. A similar leaf spring 36 is carried in the groove 29 and presses against the front surface of the rear plate 22. As is also evident in FIG. 2, the distance from the flanges 33 and 32 on the one hand and the forward face of the main body 26 of the indicating member 19 is greater than the thickness of the front plate 23 so that the indicating member extends a considerable distance forwardly of the front surface of the front plate 23. It is also important to note that, when the indicating member 19 is in the position shown in FIG. 2 with the flanges 32 and 33 pressed against the rear surface of the front plate 23, a considerable space exists between the rear surface of the indicating member and the forwardly-directed surface of the back plate 22. This distance is in any case greater than the thickness of the detent finger 34.

The operation of the invention will now be readily understood in view of the above description. First of all, the coding device 10 is intended to be mounted on a surface of a container in an automatic warehouse containing automatically-controlled conveyor systems. In most cases, the device will be mounted on the side surface of the container, the container moving along a conveyor and passing through a sensing station. The sensing station would contain four sensing elements of the optical variety, one at the level and directed toward the level of each of the grooves 12, 13, 14, and 15. Now, the material in the retro-reflective insert 28 is such that light impinging on the surface is directed back in a brilliant cone having its axis essentially common with the angle of the incident beam even though the incident beam strikes the surface at an angle other than normal. Viewed from anywhere other than near the beam of impinging light, a brilliant reflex-reflecting surface generally appears dull and uninteresting. Because of this effect, stray light from the surrounding area does not reflect a signal back to the sensing apparatus. Only light emanating from the sensing apparatus is reflected back into the sensing apparatus to give a pulse to the control apparatus controlling the automatic warehousing. Now, in order to indicate the contents of the container, the indicating members 16, 17, 18, and 19 are located in accurately located positions relative to one another. For instance, the code or number which will be "read" by the sensing apparatus from the coding device 10 (as shown in FIG. 1) is the number "1 3 6 8." In order to change the position of an indicating member, such as the indicating member 19, it is only necessary to press against its forward surface. This moves the indicating member backwardly against the front surface of the back plate 22 despite the opposing pressure of the springs 35 and 36. In this position, the detent finger 34 lies rearwardly of the back surface of the front plate 23 and is removed from the notch 21. The indicating member is then slid sideways in its groove 15 to the desired position. When the desired position is reached, the finger pressure is removed from the member and it moves forwardly. If the finger 34 is not exactly aligned with a notch 21 at that station, a slight sideways movement will cause it to snap into the position so that the indicating member is moved forwardly into the position shown in FIG. 2 by the pressure of the springs 35 and 36.

FIG. 5 illustrates the manner in which the invention would be used in an automatic warehousing system. The coding device 10 is shown attached to a vertical side of a container 37 which is moving on a conveyor belt 38 past a sensing station 39. The sensing station consists of four sensing devices 41, 42, 43, and 44, which are vertically arranged on the same level with the grooves 12, 13, 14, and 15 in the coding device 10. The sensing devices 41, 42, 43, and 44 are connected to lines 45, 46, 47 and 48, respectively, leading to a computer which controls the operation of the conveyor 38 and related equipment. Each of the sensing devices consist of a light source, such as an incandescent lamp, which directs a beam of light through a prism and through a lens system toward the retro-reflective insert 28 on one of the indicating members. The light returns in the usual way from the retro-reflective material and strikes the prism, but, because of a semi-mirror finish on the surface of the prism, it is reflected downwardly rather than passing straight through toward the light source. This downwardly-directed ray of returned light strikes a photo cell which sends a pulse through the line to the main computer for control. It will be understood that the computer will take into consideration, in the conventional manner, the particular arrangement of the indicating members 19 to take suitable action.

It can be seen, then, that by use of the coding device of the present invention normal scraping and banging of the container against guide elements of a conveyor system and the like will not disturb the coding arrangement because of the locking engagement of the detent finger 34 with its notch 21. A heavy blow by an element scraping along the front surface of the front plate 23 will cause the indicating member to be recessed into its groove (with its rearwardly-directed surface pressed against the forwardly-directed surface of the rear plate 22 so that it will not be damaged). The retro-reflective insert 28 is protected by the fact that it resides in the bottom of the recess 27.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A classifying system for use with an article having retro-reflective coding, comprising
    (a) a conveyor,
    (b) a sensing station adjacent the conveyor,
    (c) a coding device mounted on the article and including a support member having a series of spaced, parallel, co-extensive grooves extending in the direction of the conveyor movement,
    (d) an indicating member slidable in each of the grooves and having a retro-reflective material on its face, and
    (e) a plurality of positive detent stations associated with each groove for locking the indicating member in one of a plurality of predetermined positions.

2. An article classifying device, comprising
    (a) a support member consisting of a thin plate having a plurality of parallel spaced coextensive elongated slots therethrough,
    (b) an indicating member carrying sensible material slidable in each of the slots, each indicating member having a main body of generally rectangular configuration whose width is the same as the slot, each indicating member having flanges extending from the main body and adapted to engage the rearwardly directed surface of the plate, the flanges being located so that, when they so engage the rearwardly directed surface of the plate, the main body extends through the slot and forwardly by a substantial amount of the forwardly-directed surface of the plate, each slot being formed with equally-spaced notches on one edge, each indicating member having a detent finger extending from the main body to fit in a notch, and a spring means pressing the indicating member toward the plate so that the detent finger resides in a notch, but permitting movement of the indicating member away from the plate so that the detent finger resides outside of the notch and so that movement of the indicating member along the slot may take place.

References Cited by the Examiner
UNITED STATES PATENTS

| | | | |
|---|---|---|---|
| 2,058,168 | 10/1936 | Merk | 40—17 |
| 2,433,480 | 12/1947 | Rendich | 250—67 |
| 2,497,445 | 2/1950 | Gaul | 250—67 |
| 2,581,552 | 1/1952 | O'Hagan et al. | 250—224 X |
| 2,879,614 | 3/1959 | Baldanza | 250—71 |
| 2,957,079 | 10/1960 | Edholm | 250—67 |
| 3,059,112 | 10/1962 | Rogal | 250—71 |
| 3,144,926 | 8/1964 | Edelman | 209—111 X |
| 3,145,291 | 8/1964 | Brainard | 250—219 |

RALPH G. NILSON, *Primary Examiner.*

ARCHIE R. BORCHELT, *Examiner.*